US008332812B2

(12) United States Patent
Schumann

(10) Patent No.: US 8,332,812 B2
(45) Date of Patent: Dec. 11, 2012

(54) METHOD OF EXCHANGING DATA AND CONTROL METHODS BETWEEN SOFTWARE COMPONENTS AND RE-USEABLE SOFTWARE COMPONENTS

(75) Inventor: Andreas Schumann, Heidelberg (DE)

(73) Assignee: tangro software components GmbH, Heidelberg (DE)

( * ) Notice: Subject to any disclaimer, the term of this patent is extended or adjusted under 35 U.S.C. 154(b) by 1344 days.

(21) Appl. No.: 11/943,736

(22) Filed: Nov. 21, 2007

(65) Prior Publication Data

US 2008/0127081 A1   May 29, 2008

(30) Foreign Application Priority Data

Nov. 24, 2006   (EP) ..................................... 06124787

(51) Int. Cl.
*G06F 9/44* (2006.01)
*G06F 3/00* (2006.01)
(52) U.S. Cl. ........ 717/108; 717/105; 717/116; 717/120; 719/315
(58) Field of Classification Search .................. None
See application file for complete search history.

(56) References Cited

U.S. PATENT DOCUMENTS

| 6,427,230 B1 * | 7/2002 | Goiffon et al. ................ 717/108 |
| 6,986,121 B1 * | 1/2006 | Boshier et al. ................ 717/108 |
| 7,207,002 B2 * | 4/2007 | Mireku .......................... 717/116 |
| 7,350,192 B2 * | 3/2008 | Seitz et al. ................... 717/108 |
| 7,389,514 B2 * | 6/2008 | Russell et al. ............... 719/315 |
| 7,451,434 B1 * | 11/2008 | Blumenthal et al. ......... 717/116 |
| 7,519,969 B2 * | 4/2009 | Bent et al. ................... 719/315 |
| 7,523,460 B2 * | 4/2009 | Popp et al. .................. 719/315 |
| 7,614,037 B2 * | 11/2009 | Gavrilov ....................... 717/105 |
| 7,779,386 B2 * | 8/2010 | Seitz et al. ................... 717/108 |
| 8,037,449 B2 * | 10/2011 | Iborra et al. ................ 717/105 |
| 8,086,998 B2 * | 12/2011 | Bansal et al. ............... 717/108 |
| 2002/0062475 A1 * | 5/2002 | Iborra et al. ................ 717/108 |
| 2002/0133637 A1 * | 9/2002 | Popp et al. .................. 709/315 |
| 2003/0167455 A1 * | 9/2003 | Iborra et al. ................ 717/105 |
| 2004/0015858 A1 * | 1/2004 | Seto et al. ................... 717/120 |

(Continued)

OTHER PUBLICATIONS

Cliff Berg, Value-Driven IT Achieving Agility and Assurance Without Compromising Either [online], 2008 [retrieved on Aug. 9, 2012], pp. 1-514. Retrieved from the Internet: <URL: http://valuedrivenit.com/downloads/Value-Driven_IT.pdf>.*

(Continued)

*Primary Examiner* — Thuy Dao
*Assistant Examiner* — Hanh T Bui
(74) *Attorney, Agent, or Firm* — IP Strategies

(57) ABSTRACT

A method of exchanging data among software components includes acquisition by each software component of all the data that is to be provided by another software component, from a predetermined software component. Each software component delivers all data that is to be provided by it to another software component, to the predetermined software component. Providing and acquiring of all data is performed according to a predetermined standard, according to which the data comprises values and attributes. The respective data values are assigned to attributes, and semantically identical data values are assigned to the same attribute and are made distinguishable from each other by respective hierarchical information. A software component that delivers data to or acquires data from the predetermined software component, receives the respective hierarchical information from another software component. Acquiring and providing data by a software component includes transferring the respective hierarchical information.

21 Claims, 19 Drawing Sheets

U.S. PATENT DOCUMENTS

| | | | |
|---|---|---|---|
| 2004/0107414 A1* | 6/2004 | Bronicki et al. | 717/105 |
| 2005/0015775 A1* | 1/2005 | Russell et al. | 719/315 |
| 2005/0102615 A1* | 5/2005 | Roman et al. | 715/513 |
| 2005/0149907 A1* | 7/2005 | Seitz et al. | 717/108 |
| 2006/0037000 A1* | 2/2006 | Speeter et al. | 717/120 |
| 2006/0259910 A1* | 11/2006 | Popp et al. | 719/315 |
| 2007/0006149 A1* | 1/2007 | Resnick et al. | 717/116 |
| 2007/0245301 A1* | 10/2007 | Schindler et al. | 717/108 |
| 2007/0261025 A1* | 11/2007 | Seto et al. | 717/108 |
| 2008/0059950 A1* | 3/2008 | Seitz et al. | 717/108 |
| 2008/0209391 A1* | 8/2008 | Iborra et al. | 717/105 |
| 2010/0088676 A1* | 4/2010 | Yuan et al. | 717/120 |
| 2010/0257509 A1* | 10/2010 | Resnik et al. | 717/114 |

OTHER PUBLICATIONS

Qingcang Yu et al., Web-Based Control System Design and Analysis [online], Jun. 2004 [retrieved on Aug. 9, 2012], pp. 1-13. Retrieved from the Internet: <URL: http://ieeexplore.ieee.org/stamp/stamp.jsp?>.*

Andreas Rossberg, The Missing Link—Dynamic Components for ML [online], Sep. 2006 [retrieved on Aug. 9, 2012], pp. 1-12. Retrieved from the Internet: <URL: http://delivery.acm.org/10.1145/1160000/1159816/p99-rossberg.pdf>.*

* cited by examiner

| Item | Articleno. | Quant. | Article description | Weight | Palette | Location | plant |
|---|---|---|---|---|---|---|---|
| 10 | 1400151 | 1 | Syrup 6x530g | 4 | 0 | 0,01 | 0550 |
| 20 | 11800097 | 3 | Sugar Refill 30x50g | 22 | 0 | 0,10 | 0550 |
| 30 | 11800076 | 1 | Cacao tin 10x800g | 9 | 0 | 0,03 | 0550 |
| 40 | 11800249 | 1 | Hot chocolate 50x100g | 3 | 0 | 0,02 | 0550 |
| 50 | 11800498 | 1 | Chococino 8x250g | 2 | 0 | 0,02 | 0550 |
| 60 | 11807135 | 1 | Coffee extra 12x150g | 7 | 0 | 0,02 | 0550 |
| 70 | 11807125 | 3 | Coffee mild 6x200g | 5 | 0 | 0,05 | 0550 |
| 80 | 405494 | 1 | Cappuccino glass 8x500g | 4 | 0 | 0,02 | 0550 |
| 90 | 11800191 | 2 | Espresso Glass 10x500g | 5 | 0 | 0,02 | 0550 |

Fig. 2

| Object number | Attribute | Value | Superordinated object number |
|---|---|---|---|
| 1 | ORDER_NO | 1000000 | |
| 2 | ORDER_DATE | 20050910 | 1 |
| 3 | ORDERER | 10020 | 1 |
| 4 | CONSEIGNEE | 10099 | 1 |
| 5 | ITEM_NUMBER | 10 | 1 |
| 6 | ITEM_NUMBER | 20 | 1 |
| 7 | ARTICLE_NO | 10020010 | 5 |
| 8 | ORDER_QUANTITY | 200 | 5 |
| 9 | UNIT | PC | 8 |
| 10 | ARTICLE_NO | 20000010 | 6 |
| 11 | ORDER_QUANTITY | 300 | 6 |
| 12 | UNIT | PC | 11 |
| | | | |

Fig. 3A

| Object number | Attribute | Value | Superordinated object number |
|---|---|---|---|
| 1 | ORDER_NO | 1000000 | |
| 2 | ORDER_DATE | 20050910 | 1 |
| 3 | ORDERER | 10020 | 1 |
| 4 | CUSTOMER_ORDERNO | 1002000223211 | 1 |
| 5 | ITEM_NUMBER | 10 | 1 |
| 6 | ITEM_NUMBER | 20 | 1 |
| 7 | ARTICLE_NO | 10020010 | 5 |
| 8 | ORDER_QUANTITY | 200 | 5 |
| 9 | UNIT | PC | 8 |
| 10 | CONSEIGNEE | 10099 | 5 |
| 11 | ARTICLE_NO | 20000010 | 6 |
| 12 | ORDER_QUANTITY | 300 | 6 |
| 13 | UNIT | PC | 12 |
| 14 | CONSEIGNEE | 50001 | 6 |

Fig. 3B

| Object number | Attribute | Value | Superordinated object number |
|---|---|---|---|
| 1 | ORDER_NO | 1000000 | |
| 2 | ORDER_DATE | 20050910 | 1 |
| 3 | ORDERER | 10020 | 1 |
| 4 | CUSTOMER_ORDERNO | 1002000223211 | 1 |
| 5 | ITEM_NUMBER | 10 | 1 |
| 6 | ITEM_NUMBER | 20 | 1 |
| 7 | ARTICLE_NO | 10020010 | 5 |
| 8 | ORDER_QUANTITY | 200 | 5 |
| 9 | UNIT | PC | 8 |
| 10 | CONSEIGNEE | 10099 | 5 |
| 11 | ARTICLE_NO | 20000010 | 6 |
| 12 | ORDER_QUANTITY | 300 | 6 |
| 13 | UNIT | PC | 12 |
| 14 | CONSEIGNEE | 50001 | 6 |

Fig. 5

| Object number | Attribute | Value | Superordinated object number |
|---|---|---|---|
| 1 | ORDER_NO | 1000000 | |
| 2 | ORDER_DATE | 20050910 | 1 |
| 3 | ORDERER | 10020 | 1 |
| 4 | CUSTOMER_ORDERNO | 1002000223211 | 1 |
| 5 | ITEM_NUMBER | 10 | 1 |
| 6 | ITEM_NUMBER | 20 | 1 |
| 7 | ARTICLE_NO | 10020010 | 5 |
| 8 | ORDER_QUANTITY | 200 | 7 |
| 9 | UNIT | PC | 8 |
| 10 | CONSEIGNEE | 10099 | 5 |
| 11 | ARTICLE_NO | 20000010 | 6 |
| 12 | ORDER_QUANTITY | 300 | 11 |
| 13 | UNIT | PC | 12 |
| 14 | CONSEIGNEE | 50001 | 6 |

Fig. 6

1 ▼ Article process
2 ▶ with article substitution
3 ▶ without article substitution
4 ▶ schedule date of delivery
5 ▶ Availability check
6 ▶ Pricing

Fig. 10

METHOD OF EXCHANGING DATA AND CONTROL METHODS BETWEEN SOFTWARE COMPONENTS AND RE-USEABLE SOFTWARE COMPONENTS

The present invention relates to data exchange methods between software components and to re-usable software components which operate according to these methods.

TECHNICAL FIELD

Software might be classified into two classes, namely in system software and application software. System software comprises basic programs which co-operate with the computer on a very technical level. They comprise operating systems, compilers and tools for administrating computer resources.

Herein, by application software, software programs are meant which are intended for use by end users. These may comprise the whole range of applications, starting from business applications up to control applications for house hold appliances, machines, and entire production lines in the industry. Generally, application software communicates directly or indirectly with the end user and comprises database programs, word processing and spread sheets. The basis of the application software is the system software.

STATE OF THE ART

In order to render application software flexible and for cost efficiency, the software providers are repeatedly seeking for new approaches. Hereby, normalized encapsulation of functions of a software application, which can be found and used for other applications, is intended. The approaches are based on the model of distributed software in which all functions are defined as services. In such service oriented architecture, these services may be called by the program in particular sequences according to the business logic in order to support business processes. Hereby, it is started with the interfaces and the costs necessary therefore. The technical implementation is predominant. As long as process diagrams are existing, they have to be implemented technically, i.e., they have to be programmed. Furthermore, there are already methods known which generate program code on the basis of graphical process models.

Such methods are already in part used for standard software or should be more used in future. Standard software provides for pre-fabricated software as well as for a pre-designed, praxis-oriented, reliable business-related frame work. The software provider has the duty to guarantee that the software always is up-to-date, to detect and implement new requirements from business-oriented and legal prospective in time.

The introduction, adaptation and maintenance of standard software is, however, very difficult. Providers of standard software may be forced to implement many processes from different sectors in an international context according to the laws as complete as possible—always considering future requirements. Customer requirements have to be taken over in the standard. In this way, the software solution grows up, the number of customers increases, and the enormous investment pays off.

However, functionality is obtained which may be important for the one enterprise but completely unimportant for the other. According to estimations, only 20 to 30% of the available functionality is actually used by a customer.

For the individual customer, there is an oversupply of functions not needed which, in combination with the enterprise the specific business-related complexity makes it for the customer difficult to keep track. As a consequence, even small changes in the software may cause a risk for the operations and cause considerable costs.

The more detailed the requirements of all the clients are addressed, the more complex is the adaptation for the customer customizing or parameterization. The customer from the textile sector will face the possibilities of the customizing for the production industry and many other sectors. If the customer wants to change something he will always end up in the same fate—he will always face a complexity which he does not need to have. The complexity of the customizing increases in an exponential manner with the number of possibilities for setting up an individual system flexibly.

In general, the functions and processes provided by the software producers seldom correspond exactly to the ideas of the customers in many cases they do not match completely or sufficiently the most important parts, for instance, the process of the order processing. In order to adapt a field, as, for instance, the order processing, to the requirement of the own company, the complete logic of the application software which controls the process of the order processing, should be understood first. This applies to the customizing as well as to the adaptations which have to be programmed. Since the order processing provided by standard software producers is able to provide much more than the single customer actually needs, the software looses transparency and is very hard to understand. Changes are more or less risky and may cause consequences which are hart to forecast. If up-to-date, the document comprises much information which is actually not needed, which reduces the comprehensibility. Considerable follow-up costs after introduction of the standard software, which are in many cases a multiple of the acquisition price, are a consequence of a complexity which is hard to control.

For the single customer it would be ideal if the provided application software would be limited to the actual needed extent. The complexity of the application software would drastically be lowered thereby. Customizing, adaptation, and extensions would become considerably more simple, faster and less expensive be implemented.

However, the software producers would be forced to offer a plurality of applications—instead of one single complex application. For example, many variants of the delivery management of a single software producer would be generated. In order to limit the production costs, the degree of re-usability of program parts—among others—should be significantly increased. Then, the development costs for the application would accordingly be lowered. However, the costs for interfacing would remain and would lower the value of re-use.

SUMMARY OF INVENTION

It is an object of the present invention to provide a method of exchanging data between software components which ensures re-usability of the software components, as well as to provide software components which operate according to these methods.

This object is achieved by the methods and software components according to the claims.

According to a first embodiment of the invention, there is provided a method of exchanging data between a plurality of software components which interact in a computer program for executing a process, whereby each of the software components in the computer program is executable; whereby each software component acquires all the data which is to be provided by another software component, from a predetermined software component, and each software component delivers all the data which is to be provided by it to other software components, to the predetermined software component, and providing and acquiring of all the data is performed according to a predetermined standard, whereby according to the predetermined standard the data comprises data values and attributes, whereby the respective data values are assigned to attributes, whereby semantically identical data values are assigned to the same attribute and are made distinguishable by a respective hierarchical information; and whereby a software component which delivers data to the predetermined software component or which acquires data from the predetermined software component, receives the respective hierarchical information from another software component, and whereby acquiring and providing data by a software component comprises transferring the respective hierarchical information.

In a further aspect of the invention, the attribute data value assignments obtain a unique ID and are linked to hierarchically organized data objects, whereby each data object comprises at the uppermost hierarchical position an ID which renders the data object uniquely identifiable.

Hereby, the software component which requests data from the predetermined software component, may obtain the unique hierarchical relation of the requested data from another software component.

The unique hierarchical relation may be obtained by requesting the ID of the data object which is superordinated to the requested data.

According to a further aspect of the invention, a software component which delivers data to the predetermined software component, obtains the unique hierarchical relation of the data to be delivered from another software component.

Hereby, the unique hierarchical relation may be obtained by requesting the ID of the data object which is superordinated to the delivered data.

According to a further aspect of the invention, upon requesting or transmitting of data the unique hierarchical relation of the requested data is notified to the predetermined software component.

According to a further aspect of the invention, each data processing software component outputs after its processing an event which is indicative of a result of its processing.

Hereby, the event may be processed by a predetermined software component during the process.

Further, upon output of data to the predetermined software component, the keeping of the data until storing the data in a database may be initiated.

According to a further aspect of the invention, each data processing software component outputs at most two different events.

According to a further aspect of the invention, each data processing software component performs at most one activity, whereby all the activities together represent the process.

The attribute data value pairs may be stored together with the hierarchical relation in a data base.

According to a further embodiment of the invention, there is provided a method of controlling a plurality of software components which interact in a computer program for executing a process, whereby the process is decomposed, according to a model, by a number of activities, each of the software components is executable in the computer program; each activity is assigned to a software component for being executed, and each software component gets at most one activity for executing, whereby each activity executing software component provides after execution of the activity an event which is indicative of a result of the execution, whereby on the basis of the respective provided result, a respective further software component is called, whereby the relation between an event and a software component which is to be called is defined by the modeling of the process.

Hereby, a result of the execution of an activity may be indicative of the success of the execution of the activity.

Hereby, the triggered event may provide a result of the processed software component.

The result of the software component may be provided to a predetermined software component according to the method of the first embodiment of the invention.

According to a further embodiment of the invention, there is provided a computer program, comprising a plurality of software components which interact for executing a process whereby the process is decomposable into a plurality of activities, whereby the software components exchange data according to a method of one of the preceding embodiments.

Hereby, at least one of the software components may be a process component.

A process component may comprise at least one further software component and/or process component.

According to a further embodiment of the invention, there is provided a method of designing a computer program which is adapted for executing a process by using a plurality of software components, whereby each of the software components is executable in the computer program, whereby the process is decomposed into a plurality of activities such that each activity can be executed by an atomic software component, each of the activities is assigned to exactly one atomic software component for being executed, and each of the software components implement the method according to one of the preceding embodiments.

Hereby, the process may be represented by means of a graphical model, whereby the software components and the events get graphical symbols associated therewith.

The invention comprises also a software component which interacts in a computer program with a plurality of software components for executing a process, whereby each of the software components in the computer program is executable, wherein each software component acquires the data which is to be provided by another software component, from a predetermined software component, and each software component delivers data which is to be provided by it to other software components, to the predetermined software component, and providing and acquiring of data is performed according to a predetermined standard, whereby according to the predetermined standard the data values are assigned to respective attributes, whereby semantically identical data values are assigned to the same attribute, and single attributes are related to each other semantically by hierarchical relations, and whereby acquiring and providing data by the software component comprises acquisition of the hierarchical relation of the data values, and provision of data values by the software component comprises transferring data values.

According to the invention, the re-usability of the software components by uniform denotation of semantically identical data values is achieved by the fact that hierarchical information relating to the data is not maintained within each single software component. Rather, the information is provided by another software component. Moreover, the way of exchanging data on the basis of the data exchange service ("DES") as a central collecting point plays an important role.

The invention provides the opportunity to combine prefabricated software components to an executable application. Hereto, the necessary software components are graphically arranged in a process model. With the graphical design of the processes which make up an application, e.g., with the order processing of a service provider, the application software needed for order entry is obtained. During runtime of the application, the result of a process model is processed by a particular program, and the software components combined together are executed.

On the conditions defined in the claims, executable applications can be produced by graphically linking the events of re-usable software components with other re-usable software components.

A further advantage is that the graphical representation of business-oriented requirements on process level is enabled in order to resolve them in a top-down approach to detail level graphically. Thus, all business processes on different levels down to the smallest detail are made transparent. Additional requirements can be implemented in a fast and cost-efficient way. Media transitions between modeling, development environment, workflow and documentation disappear. The graphical process modeling assembles software components to application software in an easy way. The denotation of the software component symbolized in the process model is adapted to the business terminology. There is no program code generated. There are only already existing software components combined. Thus, the present invention facilitates to produce application software in an easy way from re-usable software components according to a modular design principle.

SHORT DESCRIPTION OF THE DRAWING

The present invention is described in more detail with reference to the drawing, in which FIGS. 1A, B illustrate two program flows of an article substitution in a partial business process;

FIG. 2 illustrates a part of an order entry mask;

FIGS. 3A, B illustrate an example of a data structure according to the invention;

FIGS. 4A, B illustrate the difference between software components and process components;

FIG. 5 illustrates an example of a data structure;

FIG. 6 illustrates a further example of a data structure;

FIG. 10 illustrates a part of a configuration menu;

FIG. 12A-D illustrate a summarizing example for the inventive method; and

Figure 13:
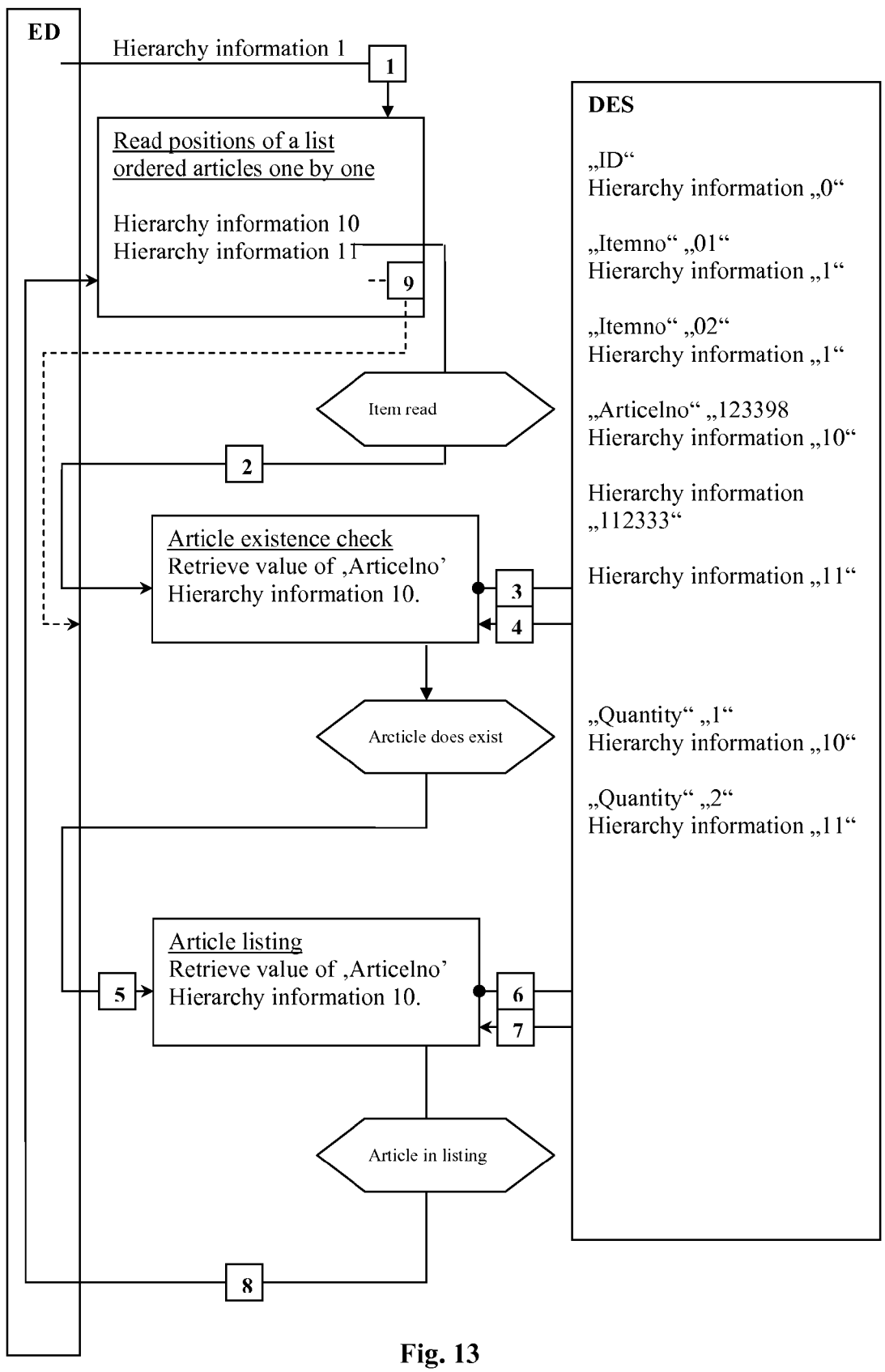

FIG. 13 illustrates the program flow and the information flow in a program part which comprises software components according to the invention.

DETAILED DESCRIPTION

Figure 1A:
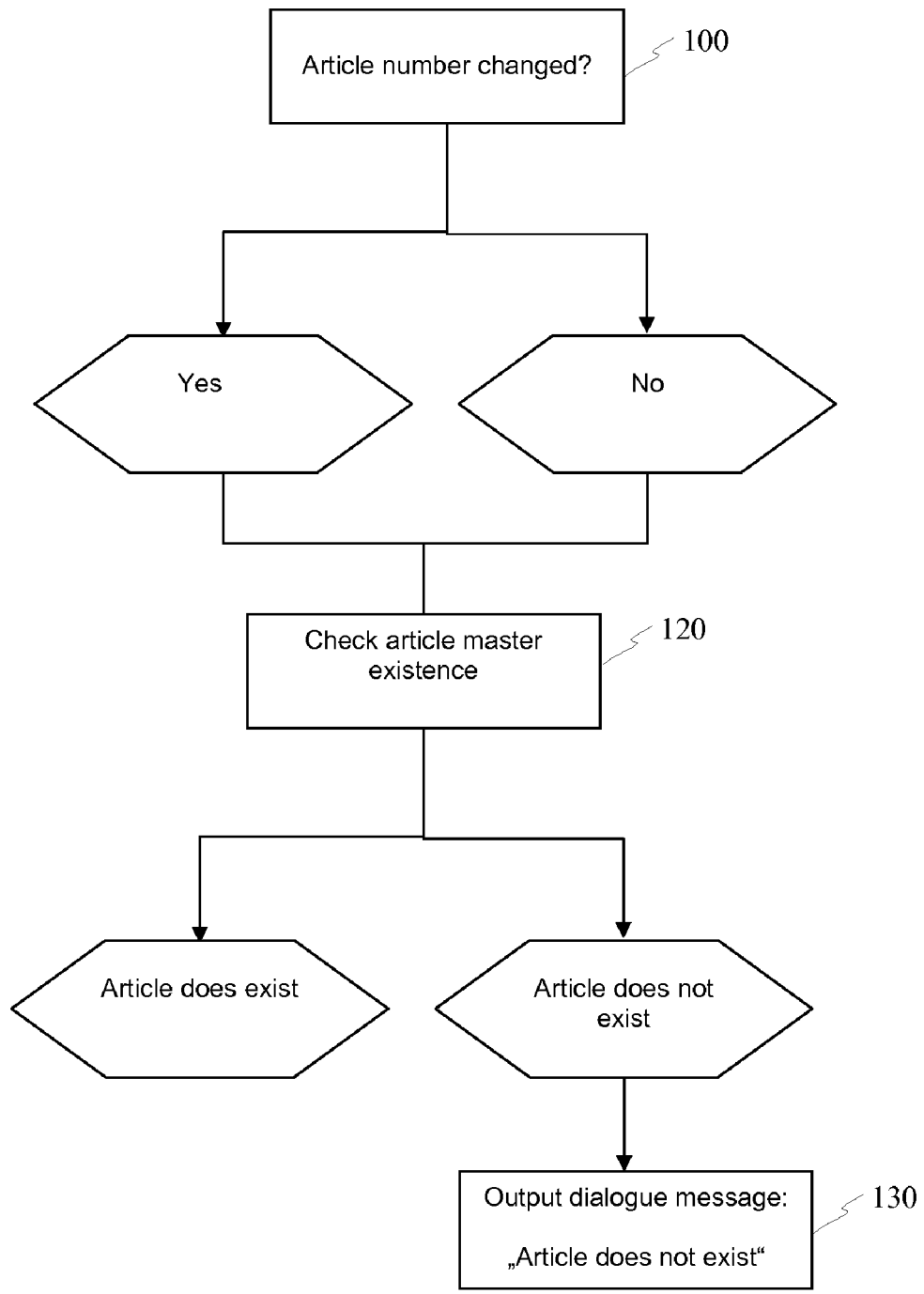

The requirement to allow combining software components in an arbitrary way is achieved according to the invention by the feature that software components are not allowed to output data to subsequent software components via their specific interface but to output data only to, and retrieve from, one single predetermined software component. This is because at development time of the software component, the potential successor is not yet known. Only by the designed process of the application process it will be known which software component is successor or predecessor of the software components. In another application process, the same software component may have other successors and predecessors, respectively. FIGS. 1A, B illustrate such an example. In the article process without article substitution according to FIG. 1A, software component 120 "check article existence" is called after software component 100 which outputs information whether or not the article number has been modified.

Figure 1B:
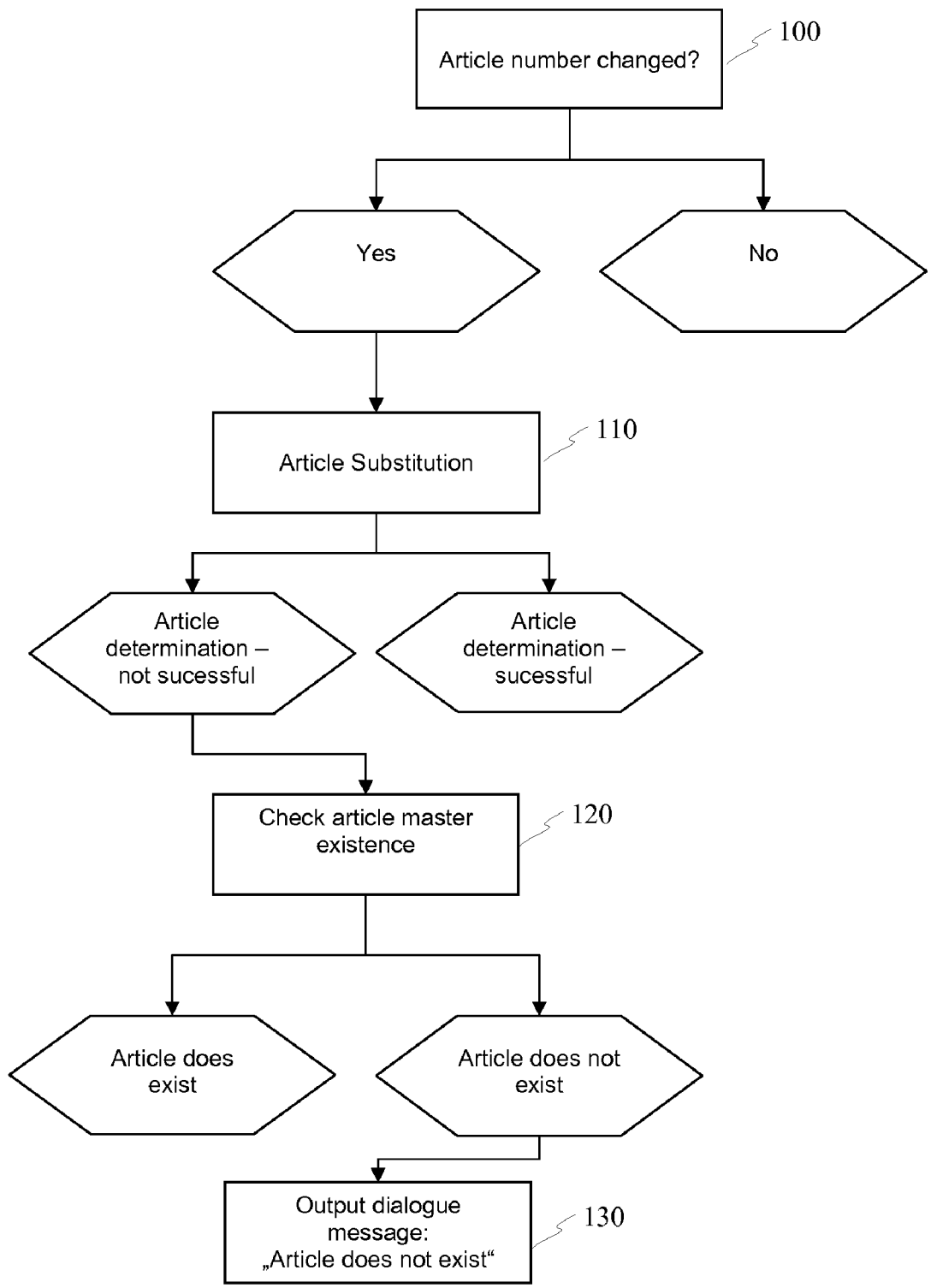

On the other hand, in the article process with article substitution according to FIG. 1B, software component 120 "check master article existence" is called after software component 110 which takes over the article substitution. One and the same software component "check master article existence" may have different successors and predecessors, respectively, according to the specific application.

Data Management

The problem as to where software components obtain the required information and where they deliver new information, is the problem of the data management from the beginning of the data processing to the time when it is stored in a data base.

According to the invention, the transfer of data of a software component to another is not possible. According to the invention, the request for information is always performed to a neutral instance which is present during the whole process, e.g., the order processing. In one embodiment of the invention, this is a software component which has a service function, and which is active during the complete process. This service, which is denoted in the following as "data exchange service" (DES)—acquires data, administrates the data during the whole execution of the process, and delivers data upon request to a software component.

According to the invention, the exchange of data is subject to a standardized procedure which is known to all instances in the program, and which is compulsory for all involved instances.

In the following, the procedure by means of the DES is described in more detail. Since every component "knows" best which data it requires and which result it achieves, i.e., which additional information it provides during processing for other software components, every software component requests the required information from the DES and provides results after processing its activity to the DES. Thus, software components which succeed within the program flow can request this data with the same technique, and can give back new data in turn. This corresponds to the principle of collection points at which things are dropped off and picked up by other interested people.

The inventive provision of the DES and the described mechanism for communication with the DES from a basis for combining software components in an arbitrary way.

In order to enable it without the need for interfaces, further mechanisms are provided.

Unitary Attributes

In order to allow for each software component to interpret and use the data which is obtained from the DES upon request, according to the invention it is defined in which manner the meaning of the data is explained. There is a common "language" created which all software components "understand", and which is compulsory for each software component to be used. Hereto, mechanisms in the form of commands or routines are provided which allow to request data from the DES and to transmit data to the DES.

The meaning of data is explained by its attributes. As an example, the value which is descriptive for a shipping location can only be retrieved by using its identifier, i.e., its attribute, by requesting software components. A software component will say "I want to know the value of the shipping location". However, if the requesting instance (i.e., the software component) and the requested instance (i.e., the DES) spoke different languages, i.e., they denoted the sending location differently, since they had assigned different attributes to the value, there would be no understanding in the way as described above. In this case, first it would have to be clarified that the identifier X of a value "sending location" is identical with the identifier "Y" of the value "sending location". This has been proven to be an error-prone method.

If the attribute "ARTICELNO" is assigned to the value which represents the article number, all software components which request the value of the article number will have to request the value for the attribute "ARTICELNO". If this is not the case because one of the software components has assigned the value of the article number to the attribute "ARTICELNUMBER" while all other software components speak about "ARTICELNO", simplicity and transparency get lost.

Rather the software component which does not follow the conventions, cannot obtain a satisfactory answer. The use of this software component would not make any sense unless there is a group of software components which would be used in the context of the order process and which would also use "ARTICELNUMBER". The re-use of the software components which use "ARTICELNUMBER" would be limited to the order process. The re-usability of the software components which use "ARTICELNO" would then only be valid, e.g., for the order processing.

Therefore, as described, according to the invention it is made sure that the attribute which comprises the value of the article number is always called "ARTICELNO", independent from the context in which the attribute is used. A CRM system, an ERP system as well as a repair system which repairs articles, should comply with it.

Data Hierarchy

Besides the standardization of the attribute, the mapping of the hierarchical relation of attributes in the data structure plays an important role.

It is not sufficient if software components which require the value of the article number request the value for the attribute "ARTICELNO" from the DES. In many cases, there are several article numbers with different values involved because orders or similar objects comprise several positions, i.e., several articles have been ordered, see FIG. 2. FIG. 2 illustrates a part of an order entry mask with several articles. Therefore, the position has to be taken into account if the value of the article is required. The position "10" will be assigned to another article value than position "20". A request for the order amount of an article to the DES has to be most specific, i.e., additionally to the identification "ORDER_QUANTITY" as attribute for the ordered amount, it must be determined for which position the amount is requested. Since the position declares article, amount, and other attributes as belonging together, the correct amount can be delivered by the DES.

The hierarchy of business data for example may be described by tree structures. In all business objects, on first level there is the identification number, as for example the order number, invoice number, order number, etc. In the order, it may be that the customer and the consignee are located below the order number. This may be different if the articles of the order positions are to be delivered to different consignees. Then, the order position is the superordinated element for the consignee. Of course this applies not only to data which represent business processes but also to many other kinds of data.

It is crucial that the hierarchical relation between all software components and the DES is always mapped in the same way. If all the software components as well as the DES speak the same language of hierarchy, a seamless information exchange is ensured.

If for example within the application "order processing" a check should take place whether for the number of a consignee as inputted on a screen there is a data entry in the data base which uniquely identifies the consignee, the software component "partner existence check" has to request first the associated partner value, i.e., the identification number of the partner, from the DES. Here, several situations may arrive. One version of the order entry may have the consignee only on the header level, i.e., there is only one consignee in the order. Another version may have the consignee on a position level since the articles should not be delivered to only one but to several consignees. The software component "partner existence check" has to deal with all these situations, see FIG. 3A.

At the time of development, the developer of the software component "partner existence check" does not know in which application program the software component will be used. Thus, the developer does not know which object number is the superordinated number at run time of the application. Depending on the actual data hierarchy, the value of the consignee may be positioned on the level of the header or of the position. According to the invention, superordinated object numbers are therefore only allocated during run time of the program, since only at that time, the values of the attributes are entered. Therefore, a request for a predetermined value can only comprise the attribute of the requested value and a dynamic specification of the superordinated object number. At development time of the software component, for the dynamic specification of the superordinated object number, there is a field provided which gets only at run time a value.

From FIGS. 3A, B it can be seen that during runtime of the program an object number will be assigned to each attribute, i.e., each attribute and thus its value has a unique object number. The hierarchical relationship of the attributes is mapped via the relation of the object numbers of the attributes, rather than by the relation of the values themselves. If the superordinated object number of the attribute whose value is requested and the attribute of the value are known, this is sufficient for obtaining the correct value upon request from the DES. In FIG. 3A, there is only one attribute which denotes the consignee, i.e., "CONSEIGNEE", by the value "10099". Requesting the DES by "GIVE ME THE VALUE OF THE CONSEIGNEE" would also yield a unique result if the superordinated object number of the attribute "ORDER_NO" were not given along.

If there are several consignees, as illustrated in FIG. 3B, the object number of the attribute "ITEM_NUMBER" as superordinated attribute of the attribute "CONSEIGNEE" as well as the attribute "CONSEIGNEE" is to be given with to the DES. In FIG. 3B, the request "Give me the value of the consignee" would not yield a unique result since, as mentioned above, there are several consignees. A request "Give me the value of the consignee for the superordinated object number 5", however, would yield a unique result, and would give back the value "10099". A request "Give me the value of the consignee for the superordinated object number 6" would yield the value "50001".

The same is valid for the relationship of article, quantity, and quantity unit. The quantity (ORDER_QUANTITY) of the position (ITEM_NUMBER) with the value "10" is assigned by the superordinated object number "5" to the same position number as the article (ARTICLE_NO) with the value "10020010". Both refer to the superordinated object number "5". If the superordinated object number is known, the value for the article and the order quantity associated therewith can be requested.

For assigning the superordinated object numbers, the invention provides the dynamic, static and the hybrid procedure.

In the dynamic procedure, the relevant object number of the attribute which represents the element which is superordinated to the consignee comes from the outside with respect to the software component. Thus, the software component can be used in an extremely flexible way. This object number may be known by the predecessor software component and may be provided via an agent component (referred to the event service described below) to the successor software component before the latter accomplishes its activity.

Then, if the consignee which is on the position level, is to be checked for positions 10 and 20 a particular software component which requests all positions of a table with partner information can be used. This software component reads the position one by one. If this software component triggers an event as soon as it has read a position and makes known the object number belonging to the position number, the subsequently provided software component "partner existence check" may use this superordinated object number and may request the value of the partner with the DES in connection with the identifier "CONSEIGNEE". Then, it can perform its check, and can make known the result by an event, see FIGS. 4A, B and FIG. 5.

Figure 4A:
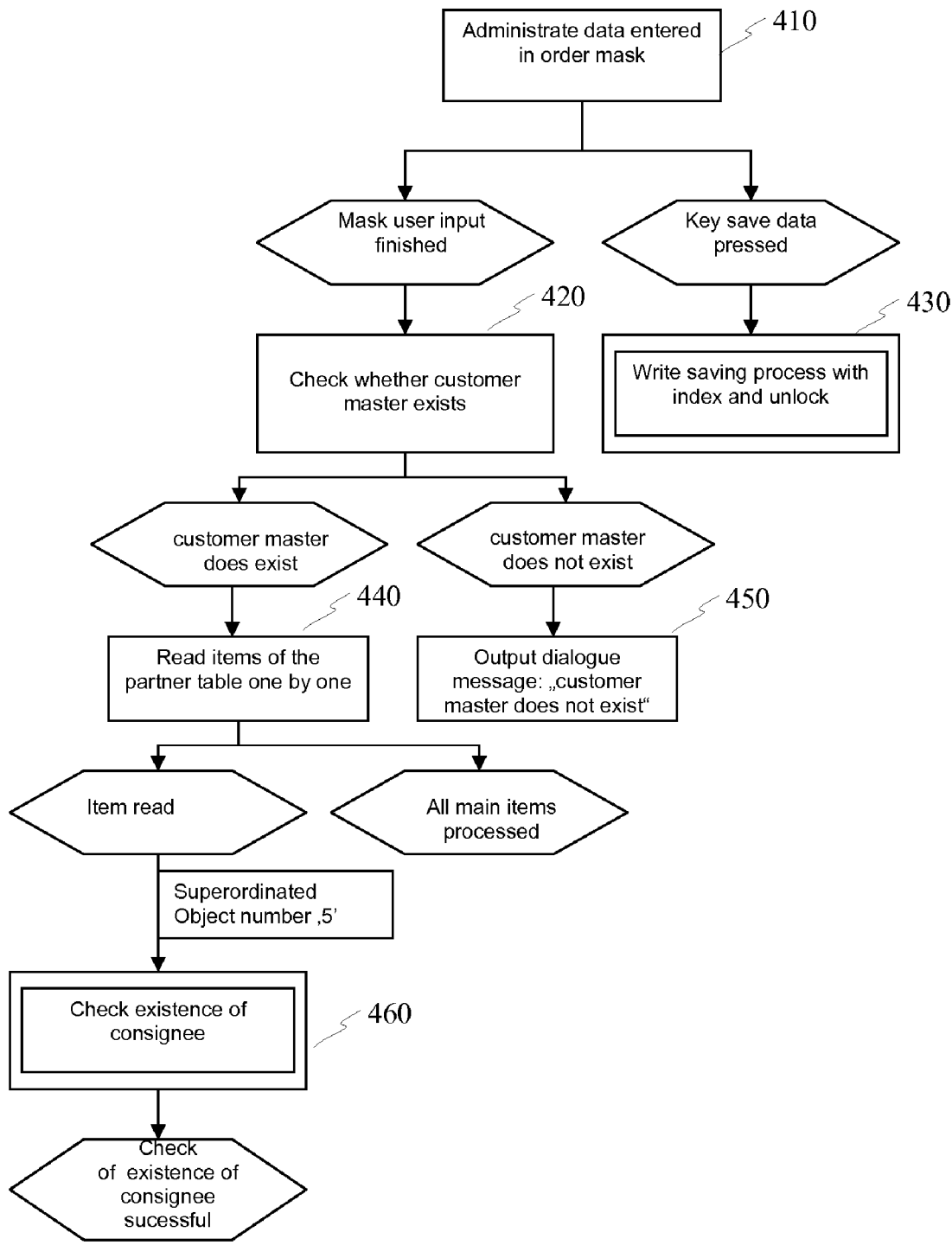

At runtime of the application, i.e., at the moment of entering the order by the operator, the software components and process components are processed, see FIG. 4A. The software components are indicated by single-framed rectangles 410, 420, 440, 450, whereas process components are indicated by double-framed rectangles 430, 460. The software component 440 "reading positions of the partner table one by one" delivers, in the example according to FIG. 4A, at the first position the superordinated object number "5" (indirectly via the event service—see the description of the event service) to the process component 460 "check existence of consignee". Hereby, it is to be noted that the rectangle with the text "superordinated object number 5" is not part of the process model. It merely illustrates the handover of the superordinated object number.

The superordinated object numbers for the consignee are derived from the hierarchy table according to FIG. 5. The consignee (CONSEIGNEE) 10099 is linked in the hierarchy table to the superordinated object number 5. The event service (see below) hands over the superordinated object number upon call of the software component "check existence of consignee".

Figure 4B:
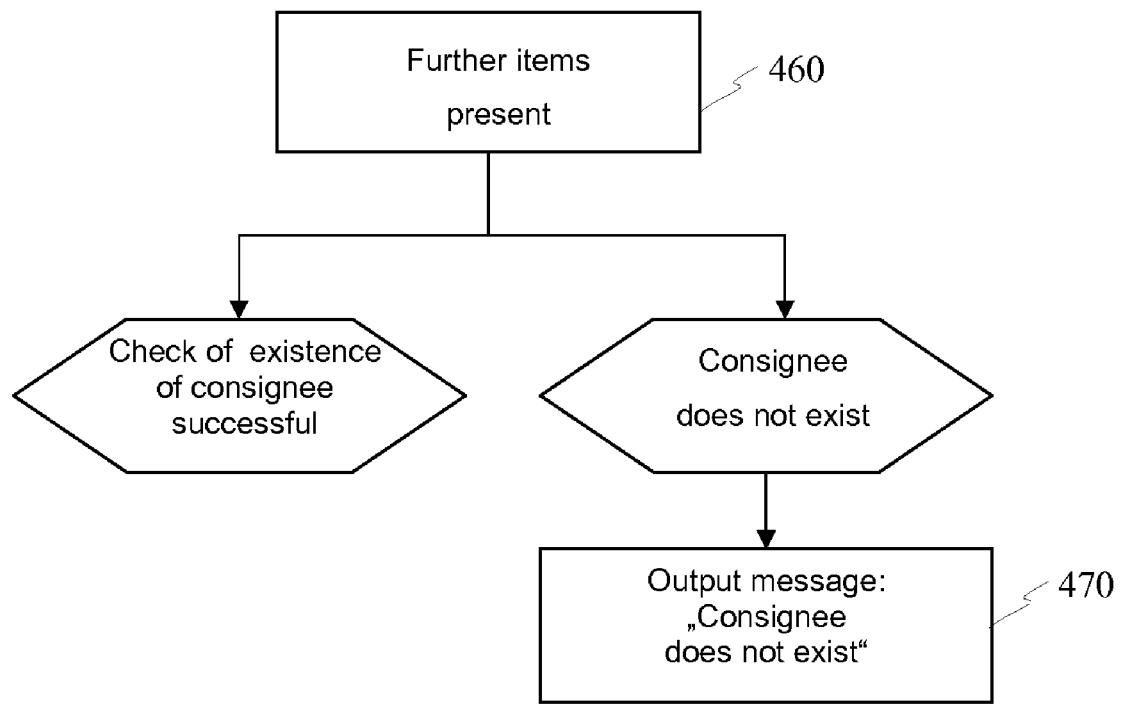

Software component 460 "check existence of consignee" (see FIG. 4B) sends a request to the DES for the value for the attribute CONSEIGNEE in connection with the superordinated object number 5. According to the hierarchy table of FIG. 5 which is managed by the DES it receives the value "10099". It should be noted that the data may be arranged hierarchically different than at the consignee, see FIG. 6. In this example, the order quantity (ORDER QUANTITY) is assigned to the object number of the article (ARTICLE NO) rather than to the position number (ITEM_NUMBER) as illustrated in FIG. 5.

For example, the ordered quantity (ORDER_QUANTITY) may be located under the article number since it is the ordered quantity of the article. In the above examples, it was sufficient for a software component which requires the order number "200" of the article "10020010", e.g., to obtain this quantity by specifying the superordinated object number "5" of the relevant position in connection with the attribute "ORDER_QUANTITY" from the DES. In this example, however, the order quantity is assigned to the object number of the article. In order to obtain the unlimited functionality of the software components, this software component applies the superordinated object number in an extended form. If it does not find a suitable amount, it may, for example, inquire again with the DES whether the object number of the article number is linked with the object number of the order quantity. In this example that would be the case. The software component could also be parameterized such that it finds the quantity via a given path (e.g., "ITEM_NUMBER.ARTICLE_NO"). The path indicates that the quantity is located on position level under the article. This procedure is denoted as static procedure. The static procedure may be avoided mostly in such cases when the rule is that all values of attributes which belong logically to a line of a table have the object number of the respective position as superordinated object number. Exceptions as for example the quantity unit which always is subordinated to the quantity has to be taken into account by the software component. The reason for this exception of the order quantity is the fact that often there exist several quantities in one position line as, for example, the ordered quantity and the available quantity. If the quantity unit differs, i.e., six pieces have been ordered but one packet is delivered, the belonging of the quantity units "piece" and "packet" is uniquely defined.

In the hybrid procedure the dynamic and the static aspects for defining the request for values or for the handover of values are combined. The hybrid procedure may be used advantageously if the data on a particular level is requested, the superordinated object number refers to the position number, for example, but the currently processed software component produces a result which is not to be laid down on the same hierarchical level. Thus, in the hybrid procedure, the data is requested, for example, via the dynamic procedure, while the determined result is laid down via the static procedure of the path specification on another hierarchical level.

The invention is illustrated with reference to program applications for controlling a business process. It should be understood that the invention can also be applied for controlling of processes of other technical fields.

Figure 7:
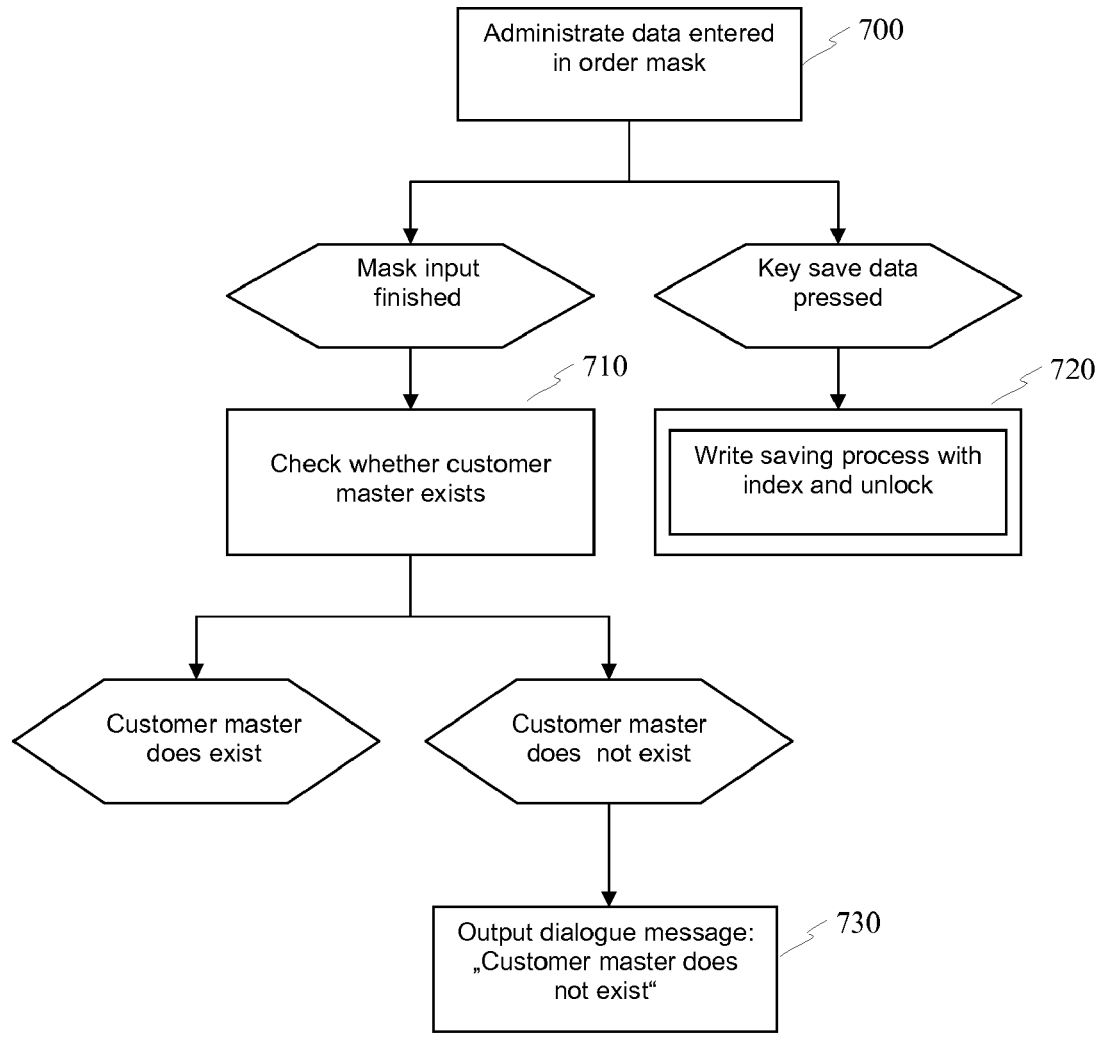
FIG. 7 illustrates a graphical representation of a business process.

FIG. 7 illustrates a graphical representation of a business process of an exemplary order data processing. Upon input of the order data into the order input screen by the operator, the inputted data is accepted and managed via the enter key (activity "manage data inputted in the order screen" of the software component 700). According to the process model, the activity "check whether customer exists" of the software component is processed at 710, because the event "data input finished" is triggered by the enter key. If the customer does not exist, i.e., there is no data about the customer present, the event "customer master does not exist" is triggered. This is linked with an activity which issues errors. In this case, the operator would get a dialog message at the screen with the text "customer master does not exist", triggered by the software component at rectangle 730.

Alternatively, a protocol string instead of a message may be written or branched into the customer data input screen.

The single activities as, for example, the check whether the customer data exists, are provided as graphical symbol (in this case, rectangle 710) in the process model along with the text which describes the activity. The available activity may be selected from a number of activities. The bottom line of the rectangle comprises events (here illustrated as hexagon)

which are indicative as to whether customer data exist or not. The rectangle 730 is assigned to a software component which is processed at runtime of the order processing software and which triggers a suitable event for the result. A software component is understood to be a program which accomplishes a predefined activity. The further processing depends on the outputted result, see FIG. 8.

Figure 8:
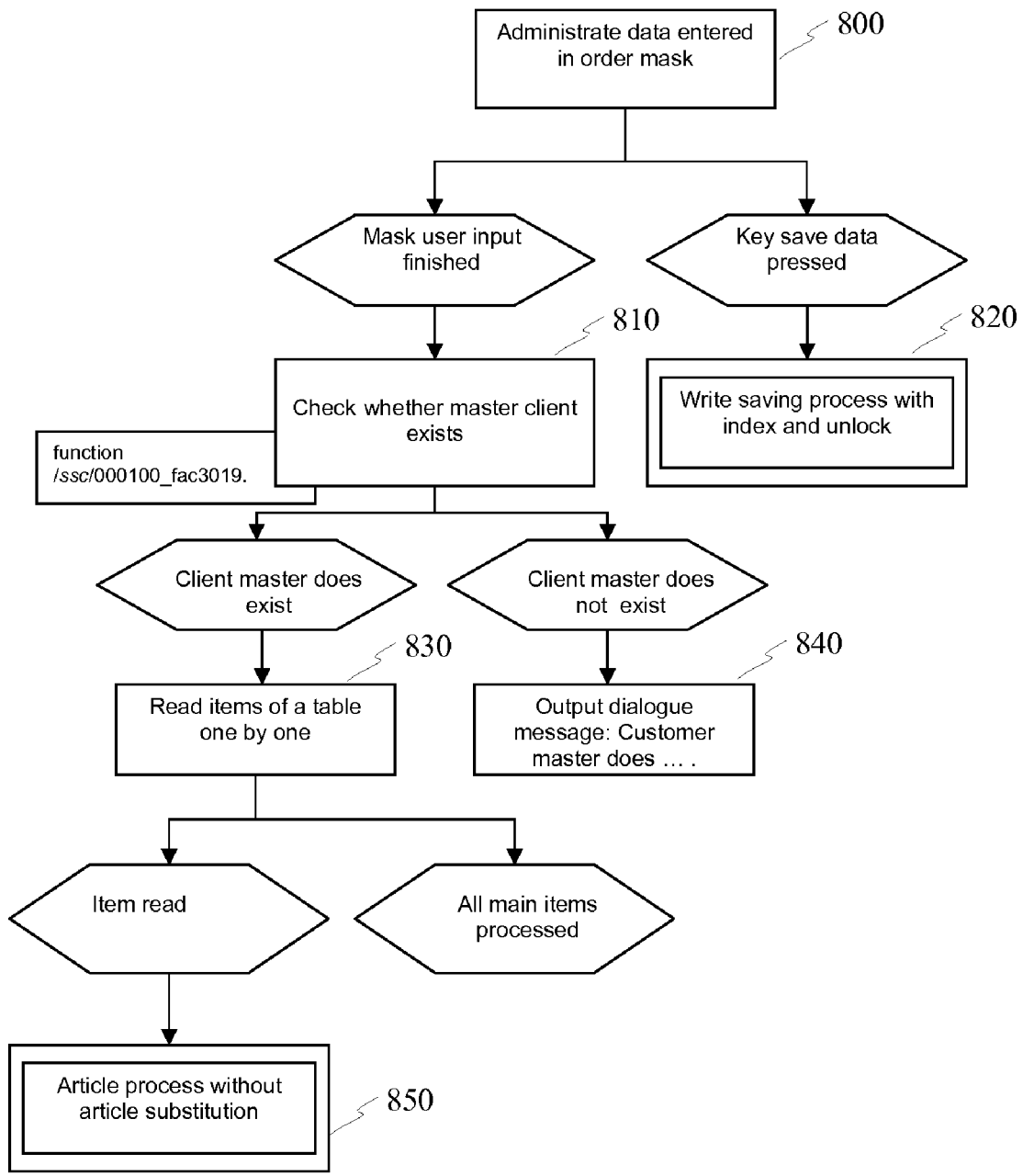
FIG. 8 illustrates a graphical representation of a part of an order mask data administration.

In FIG. 8, the rectangle 810 "check whether customer data exists" is assigned to software component "/SSC/0001000_FAC3019". However, the assignment is not explicitly provided. It is only for the sake of illustration. The other rectangles are also assigned to a software component and a process component, respectively. As process components, such software components are denoted which in turn comprise at least two software components.

The invention provides a virtually unlimited combination of prefabricated components by process modeling for creating or adapting of business applications without any interfacing costs. Interfacing costs are such costs which arise with software components which are created using the conventional programming methods if a software component is called by another one, or if a program control routine calls software components one by one (also denoted as service). In such cases, the calling software component or program control routine has to handover to the called software component such data which is required by the called software component for accomplishing its activity.

Applications which are based on the method according to the invention may be modified by adding or removing of software components in or from the process definition, by only inserting or removing the symbols in the process model.

The possibility to combine software components in an arbitrary way implies the re-usability of the software components. If the re-usability should be successful, the conditions for re-usability have to be defined.

Complex software components may be less easily re-used than components of low complexity. Complex software components will accomplish several activities. However, if only a part of the activities is needed for accomplishing a particular need, the complex software component may not be re-useable without limitation.

Thus, if a software component accomplishes only one activity it may be more often re-used. With an increased re-usability, the number of newly (or individually) programmed software components will decrease.

What is meant by the requirement that a software component should only accomplish one activity is to be shown by an example. If in a software component, the delivery date for an item is to be determined, it is important at which location the shipping of the goods is located in order to calculate the route for the transport of the item. The route along with the days of delivery agreed upon with the consignee defines the date of delivery. A software component determines the shipping point, another one determines the days of delivery, and yet another one defines the route. If the determination of the shipping point is involved in another context, e.g., which transport means (truck or ship) should be used for picking up the goods at the shipping point, the software component for determining the shipping point can also be used there. Obviously, the software component accomplishes only one activity, i.e., the determination of the shipping point. If a software component for determination of the date of delivery determined the shipping point of the goods, the dates of delivery, and the transport route, it would without doubt accomplish three activities for determination of the delivery date. Thus, the software component for determining the date of delivery is hardly suitable for determining the suitable transport means. This software component will not have the data for determining the route and the dates of delivery available, in a context in which merely the determination of the suitable transport means is performed. Thus, the software component will fail since it is unable to accomplish the activity. But even if it had the data available it would accomplish activities which would not be relevant for this issue.

Structure of the Software Components

According to the invention the structure of the software components is unitary. The inventive software components are defined to accomplish only one activity. For this, they retrieve the required data, determine a result, and make the determined data, via the DES, available to all software components which are participating in the process. The retrieval of data is performed according to the process as described above, as well as the delivery of determined or changed data. At the end of the activity, the result of the activity is made available as described above. For this, the software component triggers an event depending on the result—for example, the event "activity successfully accomplished" or "activity not accomplished".

During runtime of the program, events are always fired by using the same methods. According to the invention, this is here the only admissible way to make a result available. If events are fired during program runtime always using the same method it can be validated by generic check routines whether or not the events contained in the process model are also implemented in the software component. On the other hand, by the use of a generic check routine, it can be determined whether or not all events in the process are assigned to software components. If the software component is not at the end of the chain of events, the process is not complete, and may possibly produce fatal errors during runtime. An example is the input of orders per electronic data interchange (EDI) where a non-processed event may lead to an interruption of the input process, i.e., the remaining orders may not be processed any more.

A further standardization defines that a software component without user interface (UI) should have not more than two events. This does not apply to software components with UI since they usually need more than two events since sometimes they are several buttons for navigation which fire events. On the other hand, apart from UI software components, it is ensured that the software component accomplishes only one activity. On the other hand, check routines may detect software components which have more than two events. An example is a software component which only reads a table line by line. The events of this software component may indicate that a line has been read, that the content of one of the attributes of the position line has been modified, that all positions have been read, and that the table does not contain any position.

Better would be a software component which only checks whether the table actually has positions. A further software component reads line by line. A third one checks whether or not the content of particular attributes of the position line has changed. Thus, each software component has only one event, and thus the process is more transparent.

Re-Usability of Process Components

Process components comprise software components or a combination of software components and process components whereby process components in turn may comprise a combination of software components and process components—without limitation with respect to the levels of hierarchy.

Figure 9:
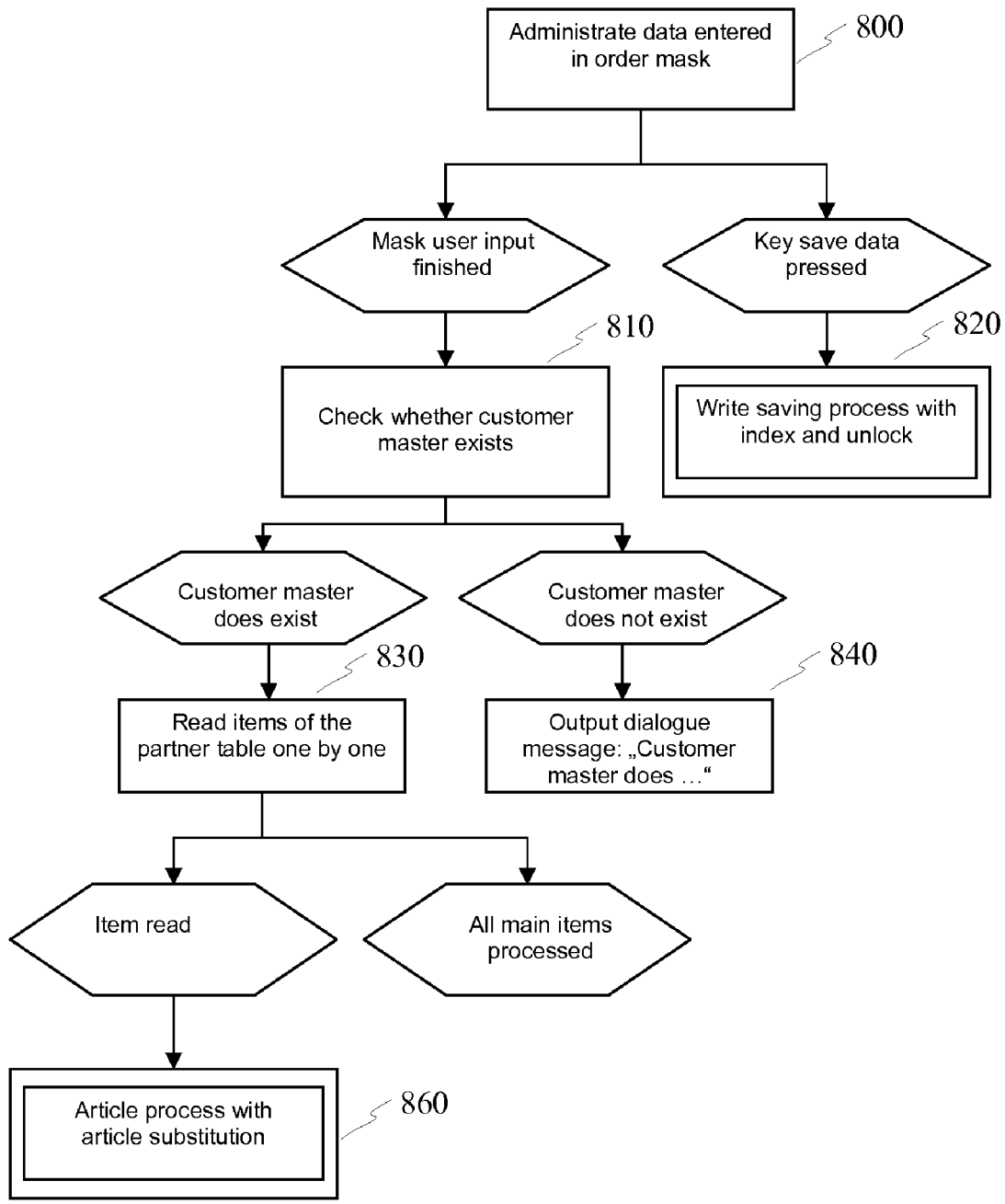
FIG. 9 illustrates a program part of a process for order entry.

The order processing, illustrated in FIG. 9, comprises "atomic" software components, and the process components "article process with article substitution" and "saving process with index writing and unlocking".

Again referring to FIG. 1B, this illustrates the process component "article process with article substitution" on a detail level. First, an action 100 determines whether the article has been changed. This may be performed by new entry or change of an already entered article in the order entry mask. Behind this action there is the decision service, which is a software component with an extremely high re-usability. If the article has been changed, the application program which has been built from this figure fires the event "yes" at the time of order entry. Thereafter, the article substitution 110 is running, etc.

Re-use of the process components is possible if they follow the inventive architecture. Process components only use software components which comply with the described standards and normalizations. The use of the software components within a process component is similar for all process components. Process components may be re-used, e.g., if only the layout of the user interface is different. In many cases, the navigation in the UI from different starting points leads to the same processes, as for example the display of a protocol concerning the progress of an order processing. This leads to a re-use of process logic.

However, processes may be re-used if they proceed according to some patterns. Thus, the check of the article existence and the processing of results may be combined to a process, and may then be frequently re-used.

An important advantage in the process modeling is the possibility to easily modify processes and to combine the re-usable parts into new processes. Then, the software producer may more easily deliver several versions of an application rather than to integrate all in one approach.

Graphical Process Modeling

According to the invention, the process modeling defines the call of the components including their sequence always in the same way. Software component and process component appear as "black box", herein denoted by rectangles. On this level, the program code is hidden. Results are published via outputs to the outside of the black box. A black box as well as the results of the software components which are given in the form of events have a normalized graphical representation. A particularly suitable form of representation are event-process chains. By graphical linking of events with the symbols of the software components, the process is defined. The graphical process modeling itself is an important part of the standardization. All fields of the program logic are represented in the same manner and are not subject to individual preferences or habits of developers. Thus, the process modeling ensures also the re-usability on the design level of processes. Moreover, it ensures that process documentation and actual process progress are intrinsically tight to each other. Each change of the process model documents it implicitly. Each change of the process model changes the application. The software components provide, together with the process modeling, for the necessary flexibility on detail level. They have the highest degree of re-usability.

Events

According to the invention, events are besides the software components and process components a further condition for providing applications without interfaces. Events are part of the software components as well as of the process components. For instance, if an activity has been processed successfully within a software component, this will be published as an event. In graphical form it may be given in form of an hexagonal symbol, as it is used in representations of event process chains. This symbol will be graphically linked with a rectangular symbol as representation of a software component, in order to define the link between software component and event.

Software components with events as end-criterion have the advantage that the intrinsic functionality given as program code remains hidden in the background. The activity may be given by the description of the software component, and the result is published via events. Since a high re-usability leads to clear software components, the description may be correspondingly short but, nevertheless, meaningful. For example, the technical process of an article existence check may be irrelevant to the process designer if the description of the activity is unambiguously clear as to the activity of the software component. The process designer should only be enabled to see what the software component does, which results it may gain, and how the further process progress will be. The technical implementation may and should remain in the background. In this way, complexity is removed from the overall process since no detail knowledge blocks the view onto the essential things.

For software components which are designed according to the rules as mentioned above, and which work correspondingly, changes as for instance the error correction within the software components do not require adaptations of the surrounding components as long as the events remain the same. Since they are generally only two events, i.e. "successful" and "unsuccessful", there is no need to change something with the events to be issued.

Process components with events as end-criterion have in the same way the advantage that the intrinsic functionality remains hidden in the background. Only on request—for instance by double click on the symbol of the process component in the process model—its intrinsic functionality becomes visible.

The linking of software components and/or process components with the events of the predecessor contributes substantially to the fact that upon call, there is no interfacing. The linking contributes further to the use of the event service, which will be described below.

Event Service

The event service according to the invention controls the sequenced call of the inventive software components during runtime. The event service controls the conditions, the times, and the sequences in which the software components are processed.

For this, according to the invention, certain metadata from the process model is provided to an event service. The metadata contains the information as to which software component is called at process start, and which software component is to be processed next. The software component which is to be processed next is defined in the process model depending upon the potential events. The relationship between the events and the software components is part of the metadata and is available to the event service during runtime. For instance, software component A at the start in the process model is defined as the first software component, i.e., in a graphical representation illustrated as a rectangle. Software component A knows the events E1 and E2. This means that depending on the internal program logic of software component A, at process time of the software component A, event E1 or E2 is triggered.

If in the process model event E1 of software component A is linked with software component B, and event E2 is linked with software component C, the event service calls software component B if software component A triggers event E1. If software component A triggers event E2, software component C is called. For software component B and C it is irrelevant which software component has been processed before. They only care for retrieving the required data from the DES. Of course, it is important that certain software components have been processed before, in particular such software components which have delivered the information which is required by software components B and C to the DES. However, it is not important for software components B and C which these software components were.

The same applies to the process components which comprise as first element a software component or a process component. If the first element is a process component the search continues until a software component is found in the first position. According to the process model this triggers again events which are linked with other software components or process components.

Thus, the event service is an agent between events and software components. It obtains its information only from the process mode.

The inventive event service contributes also to the re-usability since it processes the evaluation of events always in the same way.

While with the known approaches, the control routine for processing of certain functions or of so called services is always newly programmed, the inventive event service is only programmed once, and is always and only used for this purpose. Thus, it is also part of the standardization of software applications.

A further problem with conventional approaches of software development is the fact that upon call of program routines, which in turn may call program routine and subroutine, interfaces have to be served. Information may be handed over via interfaces to the programs which are called by the control routine, which may cause troubles to the developers of other approaches. On the one hand this leads to costs. On the other hand, interfaces may change—then versions may arise which have to be managed, and which may cause further interfacing costs. The service of interfaces may be done according to different processes and thus it will cause many possibilities of errors and confuse the developer.

By the use of the inventive event service, the requirement as to call programs in a predefined sequence and to service their interfaces is avoided. Errors will be avoided and the legibility of the application is increased by virtue of the similarity of the process.

Decision Service

The inventive decision service is implemented by a software component which provides a very specific service—similar to the event service. The decision service has the function to make a decision depending on current values of selected attributes of a process, for instance, the order processing. The result is published in the form of events. The decision service itself does not change any data nor does it determine new data. For instance, within the frame of the order processing, the decision service may have the task to check whether the desired date of delivery is later than the current date. If so, this will be published by the one event which indicates that this condition applies. If not so, another event will say that the check has lead to a negative result. Thus, essential decisions, which would otherwise be met in the one or the other way, can be processed in one and the same way. The standardized approach leads to generic routines which are based on this knowledge.

Extendability

The set of given software components may be extended at any time. Thus, there is no obligation to use only already present software components. The process may be extended at any time by individual programming as long as the principles of the architecture are complied with. Too large units may be decomposed into granular software components at a later time. The sections "process templates" and "process configuration" explain the adaptation possibilities. Extensions are always subject to the same principle. Process components may be replaced by larger or smaller process components. Additionally required software components and process components may be inserted into existing processes.

Process Templates

Graphically modeled processes provide application specific content, e.g., so called business content. The more processes are already implemented, the higher is the probability that a high coverage is obtained for the possible customer. Those processes may either be used unchanged or be adapted to the particular requirements of the customer. Certain process components, which generally are located on lower levels of hierarchy of the overall process, may be replaced by individual process components. The individual process components in turn may be derived from process components, or may be combined from the present software component in a completely new way. By decoupling the software components by means of events, it is ensured that existing functions are not affected by adaptations. In conventionally programmed standard software, changes often effect other functional parts because adaptations to data structures or interfaces have to be made which go through the complete process.

By provision of complete processes, for instance the process of order processing up to invoice issuing as so-called best practice solution, the gap between the high requirements for individual programming and standard software is closed. Standard software cannot be used directly at all but only after extensive adaptations in the form of customizing. The inventive method allows covering the requirements of the customer in the same way as it is true for standard software. However, the programming costs, i.e., the number of programs and the functions is only a small part of the volume of the standard software since the customer gets exactly what he needs. Due to the omission of not required functions and due to the transparency which is obtained by the smaller volume of functions, and by the tailored application, the costs for customizing decrease significantly compared to standard software.

Process Configuration

The invention is based on the fact that only tailored solutions can meet the requirements of the customers. Best practice solutions are very suitable for deriving tailored solutions therefrom. The derivation may be done via a configuration assistant which filters, by questions and answers, the optimum processes. Hereby, from the variants of the process components "article process" which is responsible for the change of the article number in the record processing, a variant "article process with articles listing" is selected. If the original complete process for the order processing comprises the sub-process "article process with article substitution" the sub-process is replaced by the process component "article process with article listing", see FIG. 10.

The configuration assistant may provide the selection as illustrated in FIG. 10. If the customer selects "article process with article substitution" he obtains the process illustrated in FIG. 9. This process is an order entering for customer group 2. All customer goods are associated with this consumer group. Consumer goods operate generally with article substitution. Therefore, the process component marked with red corner points "article process with article substitution" is processed. Therein, an article ordered by a customer, will be substituted by another article or by another variant of the article.

Figure 11:
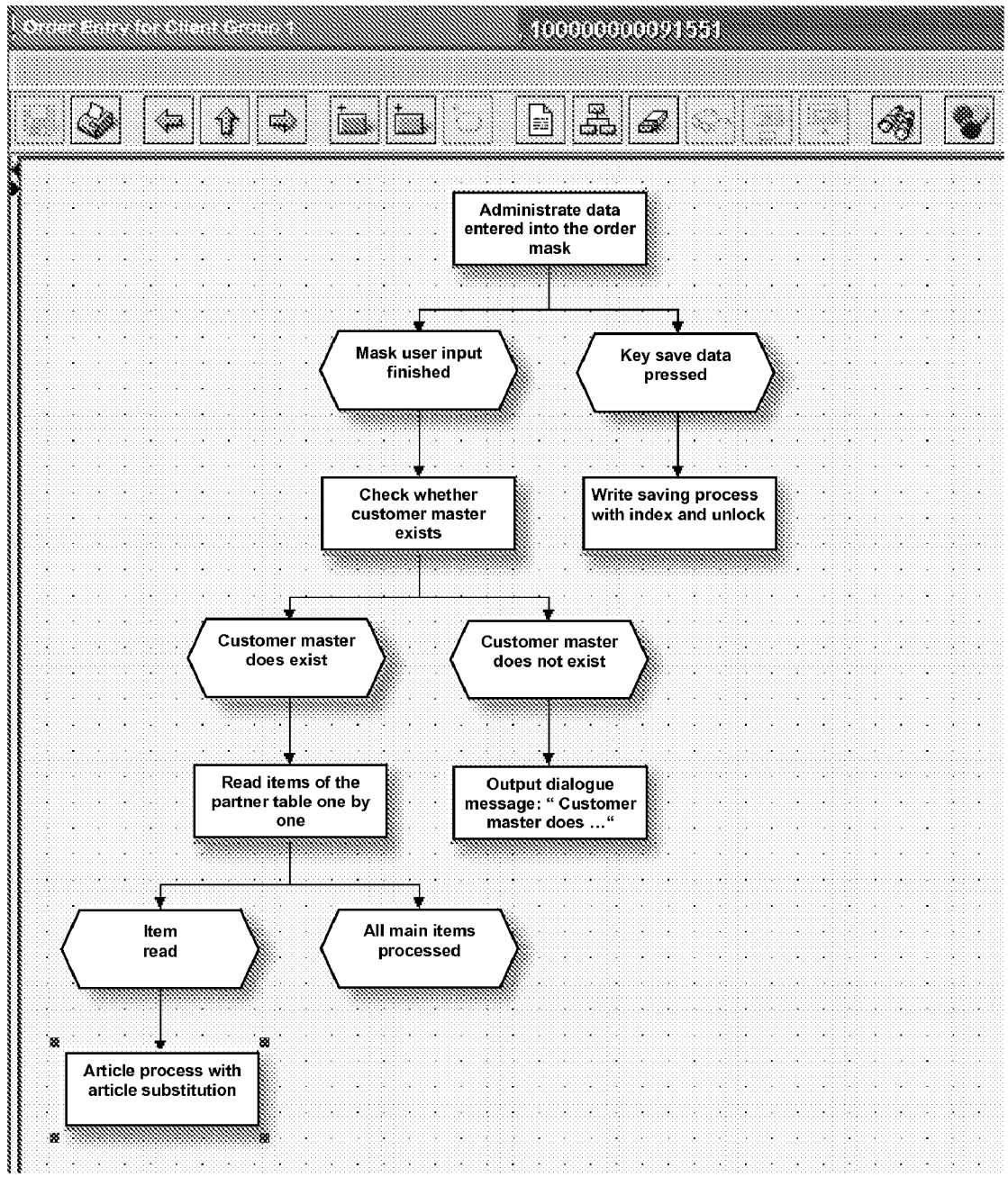
FIG. 11 illustrates a configured process.

If the customer selects "article process without article substitution" in the menu of FIG. 10, he obtains the process according to FIG. 11. This is an order entering for customer group 1. This customer group operates basically without article substitution. Therefore, the process component marked with corner points "article process without article substitution" is processed.

EXAMPLE

Figure 12A:
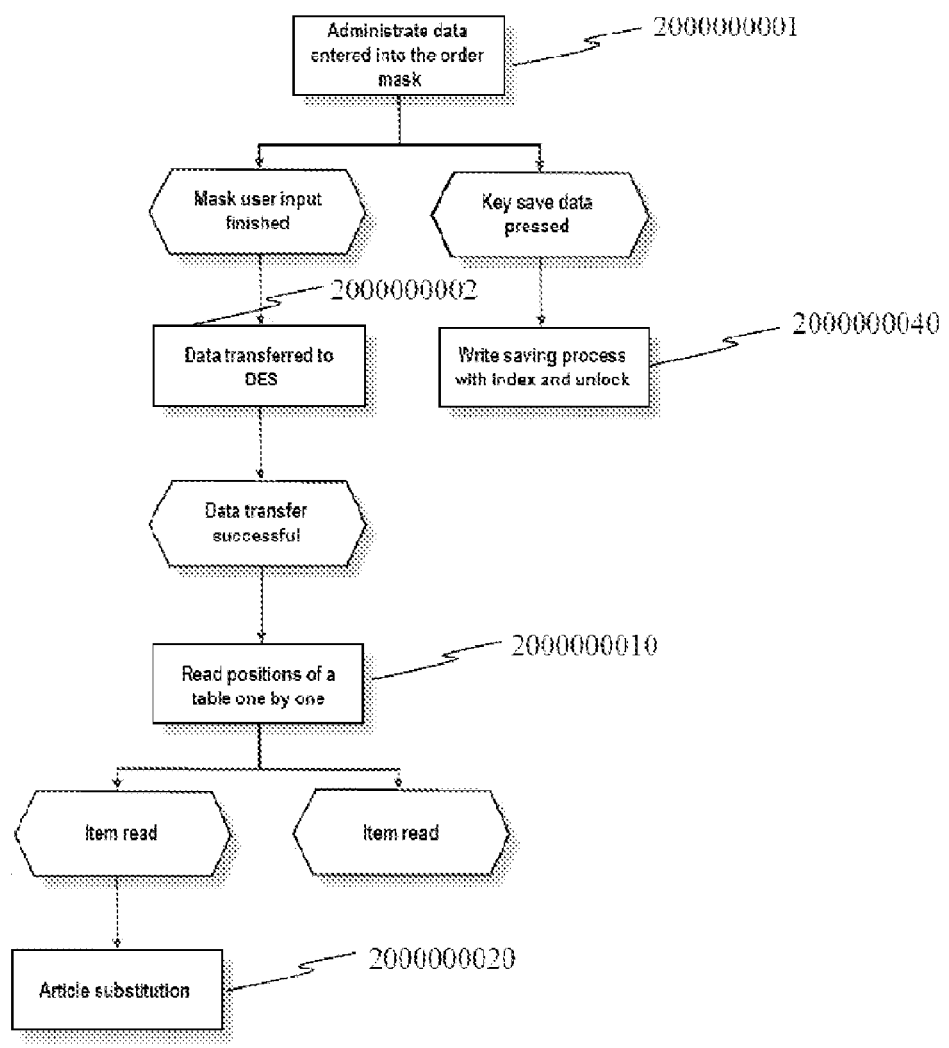

By reference to FIG. 12A to FIG. 12D, the process according to the invention is summarized with a program sequence. The program sequence according to FIG. 12A illustrates a portion of an order data management, in the form of a graphical process model.

Figure 12B:
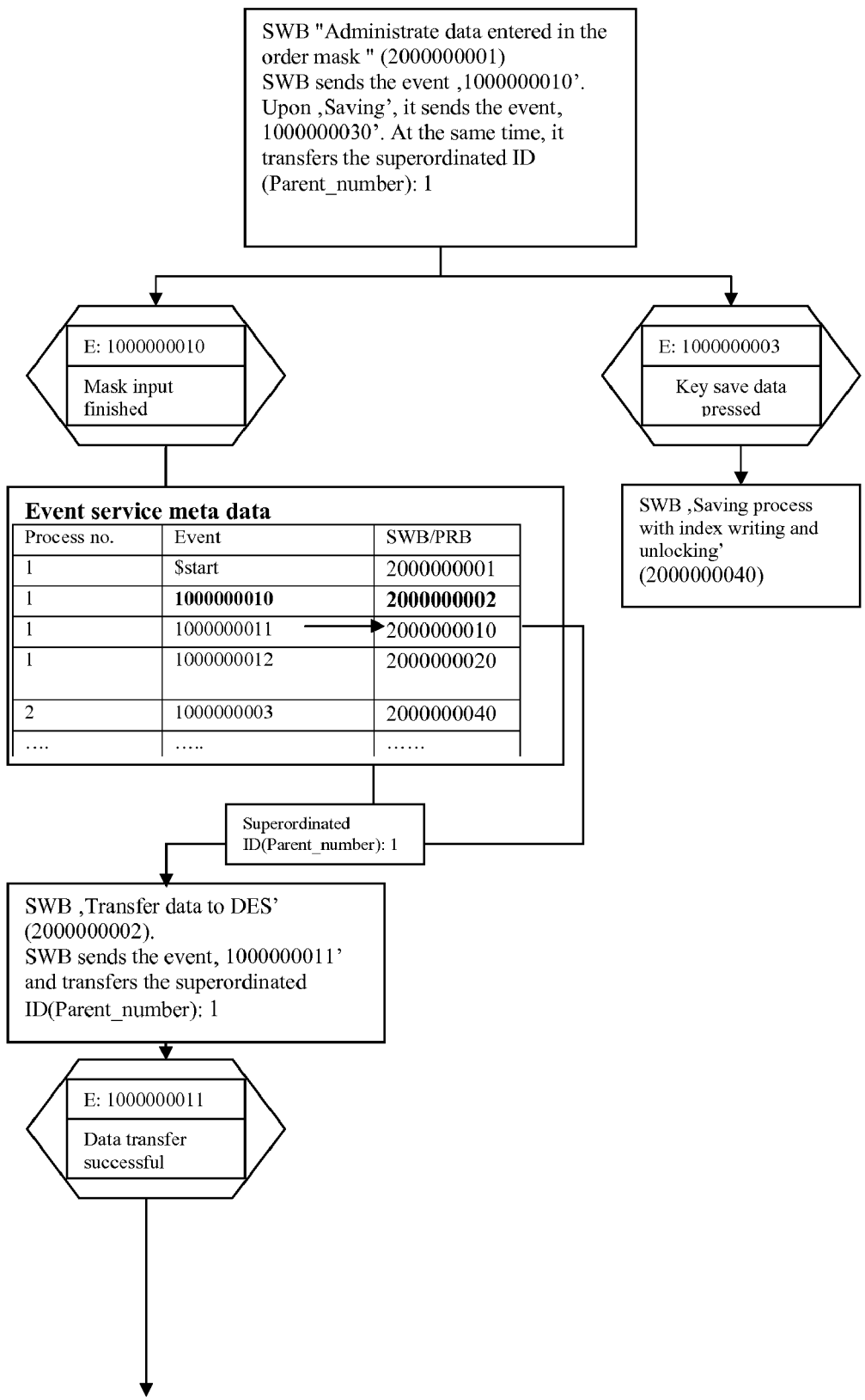
Figure 12C:
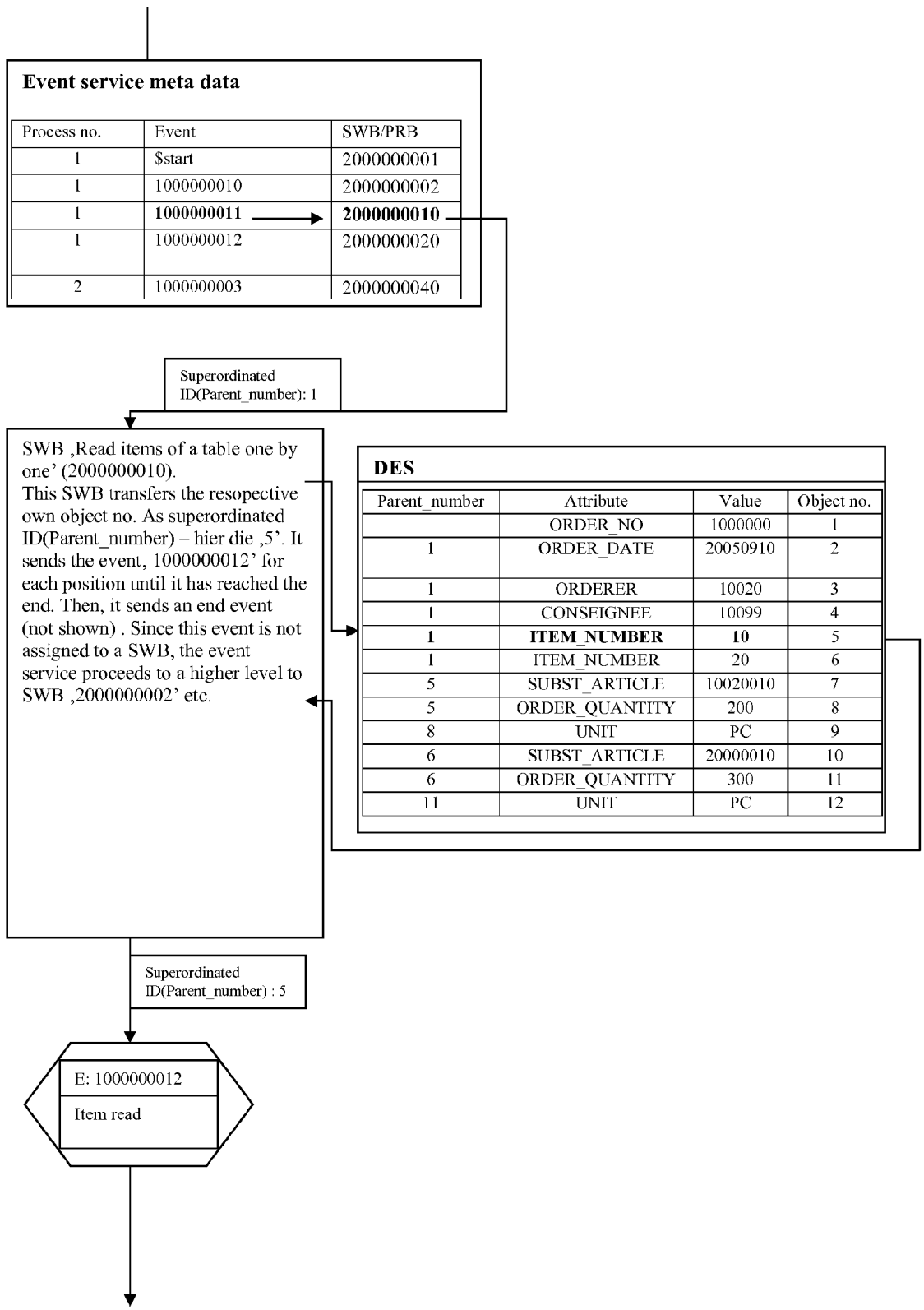
Figure 12D:
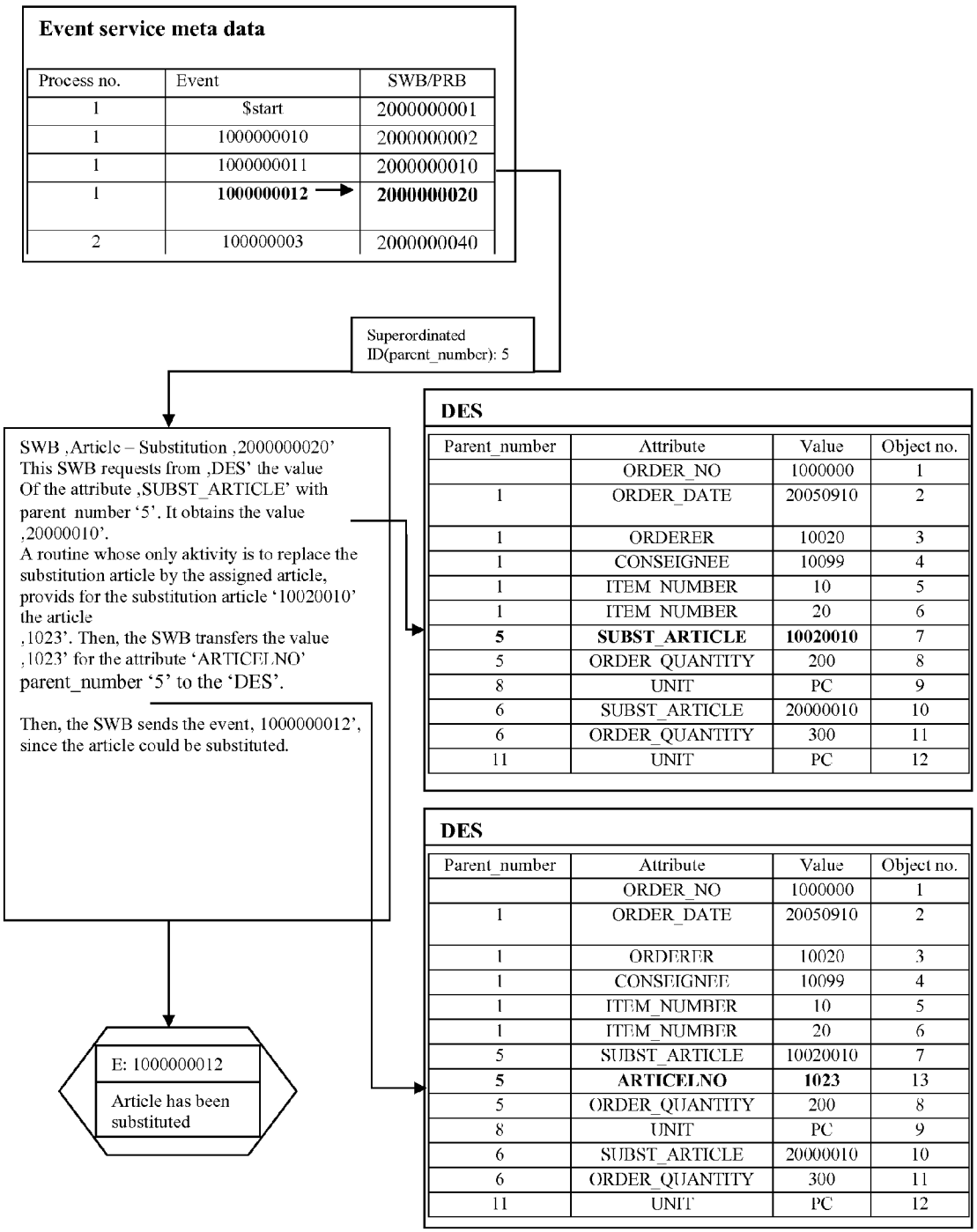

FIG. 12B illustrates the cooperation of the software components during runtime of the program according to the process model of FIG. 12A. The table "event service metadata" shows the metadata derived from the process model of FIG. 12A, which is provided to the event service ED for being evaluated. The table brings the processes (first column), the possible events (second column) and the software components/process components (SWB/PRB—third column) which are to be called during runtime in relation to each other. In the program sequence, the software component "2000000001" with the activity "administrate the data entered in the order mask" is called due to the relation to the event "$start" by the event service. If the entry of data into the order mask is finished, the software component "2000000001" provides the event "1000000010" to the event service. Upon provision of the event "1000000010" the software component hands over the superordinated ID (parent_number) "1" to the event service. The event "1000000010" is then available to the event service for being processed. The event service determines on the basis of the provided event from the metadata of the table "event service metadata" the next software component. This is the software component "2000000002" with the activity "hand over data to the DES". The software component "2000000002" is started by the event service and obtains from the event service the superordinated ID (parent_number) 1. After accomplishing its activity (i.e., the successful data hand over to the DES), the software component triggers the event "1000000011", and notifies the event service about this event and the superordinated (parent_number) "1". Based on the event "1000000011", the event service determines from the metadata according to table "event service meta data" the next software component in the program sequence to be the component "2000000010" for performing the activity "read positions of the table one by one" and calls this software component. This software component reads the positions of the table one by one and hands over the object number of the position number (attribute "ITEM_NUMBER") as subordinated ID—in the example the number "5", for the subsequent software component to the event service. The software component "2000000010" triggers the event "1000000012" after each read position and hands it over to the event service. On the basis of this event, the event service calls the software component "2000000020" for performing the activity "article substitution". This software component retrieves the value of the substitution article (i.e., the article number which is to be replaced) from the DES. The specification of the parent_number "5" in combination with the attribute "SUBST_ARTICLE" is sufficient for the DES to find the correct value. The routine provided hereto notifies by processing a decision table which article should replace the substitution article. In this case, the routine returns the value "1023" to software component "2000000020" based on the decision table. Then, the software component passes the value "1023" with the attribute "ARTICLENO" and the parent_number "5" to the DES. The DES adds a new line

| 5 | ARTICELNO | 1023 | 13 | in its "data memory". The attribute-value-pair "Articelno/1023" obtains a new object number 13.

FIG. 13 illustrates the program sequence and the information flows in a program portion which comprises the software components described above. The event service ED calls (1) the software component SWB, which reads the ordered articles one by one. At the same time, the SWB obtains hierarchy information (which, however, is of no interest for this particular SWB). For each hierarchy the SWB returns the hierarchy information assigned to the position and the event "position read" to the ED. The ED passes this hierarchy information upon call of the succeeding SWB "check article existence". The SWB "check article existence" determines the ED by means of the event mentioned before. The SWB "check article existence" can obtain the correct value from the DES (3 and 4)—in the example value "123398"—by using the hierarchy information and the attribute of the article value (here Articelno). Thereafter, the user may obtain a message that the article does not exist (in the figure not shown). Then, the event service ED calls (5) the software component SWB "list articles" on the basis of the event "article exists". This software component (6 and 7) retrieves again the value for the article number from the DES. The SWB checks whether the current article is provided in the one article list which has been defined for certain customers or groups of customers. Also this SWB uses the same attribute because it is a semantically similar value. Only by this, it can be ensured that an arbitrary SWB obtains the correct values, or delivers correct values to the DES. This SWB also operates with the hierarchy information which is used by the SWB "check article existence".

Then, with step (8) the next hierarchy information from the SWB "read positions of a list of the ordered articles one by one" is passed to the ED since the event "article in listing" is not connected with another SWB. The further procedure (9) is illustrated by a broken line. The SWB "check article existence" will obtain with the hierarchy information "11" and the attribute of the article value (here articelno) upon request to the DES the value "112333".

As can be seen from the figure, all the data flows are between the SWB and the DES. No SWB passes data values which are intended for a subsequent SWB directly to this software component. In contrast to this, hierarchy information is passed from one SWB to the other as illustrated by the arrows on the left hand side of the diagram. Semantically similar data is assigned to the same attribute.

The event service determines the correspondingly next SEB on the basis of events, and thus defines the program sequence.

The invention claimed is:
1. A method of exchanging data between a plurality of software components which interact in a computer program for executing a process, whereby each software component of the plurality of software components in the computer program is executable;
   characterized in that
   each software component acquires all the data which is to be provided by another software component, from a predetermined software component, and each software component delivers all data which is to be provided by it to another software component, to the predetermined software component, and whereby providing and acquiring of all the data is performed according to a predetermined standard, whereby according to the predetermined standard the data comprises data values and attributes, whereby the respective data values are assigned to attributes, whereby semantically identical data values are assigned to the same attribute and are made distinguishable from each other by a respective hierarchical information; and whereby a software component which delivers data to the predetermined software component or which acquires data from the predetermined software component, receives the respective hierarchical information from another software component, whereby acquiring and providing data by a software component comprises transferring the respective hierarchical information, and whereby the attribute data value assignments obtain a unique ID and are linked to hierarchically organized data objects, whereby each data object comprises at an uppermost hierarchical position an ID which renders the data object uniquely identifiable.

2. The method according to claim 1, whereby the software component which requests data from the predetermined software component (DES), obtains a unique hierarchical relation of the requested data from another software component.

3. The method according to claim 2, whereby the unique hierarchical relation is obtained by requesting the unique ID of the data object which is superordinated to the requested data.

4. The method according to claim 1, whereby a software component which delivers data to the predetermined software component, obtains a unique hierarchical relation of the data to be delivered from another software component.

5. The method according to claim 4, whereby the unique hierarchical relation is obtained by requesting the unique ID of the data object which is superordinated to the delivered data.

6. The method according to claim 1, whereby upon requesting or transmitting of data a unique hierarchical relation of the requested data is notified to the predetermined software component.

7. The method according to claim 1, whereby each data processing software component outputs after its processing an event which is indicative of a result of its processing.

8. The method according to claim 7, whereby the event is processed by a predetermined software component (ED) during the process.

9. The method according to claim 1, whereby upon output of data to the predetermined software component, the keeping of the data until storing the data in a database is initiated.

10. The method according to claim 1, whereby each data processing software component outputs at most two different events.

11. The method according to claim 1, whereby each data processing software component performs at most one activity, whereby all the activities together represent the process.

12. The method according to claim 1, whereby the attribute data value pairs are stored together with the hierarchical relation in a data base.

13. Method of controlling a plurality of software components which interact in a computer program for executing a process, whereby the process is decomposed, according to a model, by a number of activities, each of the software components is executable in the computer program;

each activity is assigned to a software component for being executed, and each software component gets at most one activity for executing, whereby each activity executing software component provides after execution of the activity an event which is indicative of a result of the execution, whereby on the basis of the respective provided result, a respective further software component is called, whereby the relation between an event and a software component which is to be called is defined by the modeling of the process, whereby the result of the software component is provided to a predetermined software component according to a method of exchanging data between a plurality of software components which interact in a computer program for executing a process, and whereby each software component of the plurality of software components in the computer program is executable;

characterized in that each software component acquires all the data which is to be provided by another software component, from a predetermined software component, and each software component delivers all data which is to be provided by it to another software component, to the predetermined software component, and whereby providing and acquiring of all the data is performed according to a predetermined standard, whereby according to the predetermined standard the data comprises data values and attributes, whereby the respective data values are assigned to attributes, whereby semantically identical data values are assigned to the same attribute and are made distinguishable from each other by a respective hierarchical information; and whereby a software component which delivers data to the predetermined software component or which acquires data from the predetermined software component, receives the respective hierarchical information from another software component, and whereby acquiring and providing data by a software component comprises transferring the respective hierarchical information.

14. The method according to claim 13, whereby a result of the execution of an activity is indicative of the success of the execution of the activity.

15. The method according to claim 14, whereby the triggered event provides a result of the processed software component.

16. Computer program, stored on a non-transitory computer-readable medium, comprising a plurality of software components which interact for executing a process whereby the process is decomposable into a plurality of activities, whereby the software components exchange data according to a method of claim 1.

17. The computer program according to claim 16, whereby at least one of the software components is a process component.

18. The computer program according to claim 17, whereby a process component comprises at least one further software component and/or process component.

19. Method of designing a computer program which is adapted for executing a process by using a plurality of software components, whereby each of the software components is executable in the computer program, whereby the process is decomposed into a plurality of activities such that each activity can be executed by an atomic software component, each of the activities is assigned to exactly one atomic software component for being executed, and each of the software components implement a method of exchanging data between a plurality of software components which interact in a computer program for executing a process, whereby each software component of the plurality of software components in the computer program is executable;

characterized in that each software component acquires all the data which is to be provided by another software component, from a predetermined software component, and each software component delivers all data which is to be provided by it to another software component, to the predetermined software component, and whereby providing and acquiring of all the data is performed according to a predetermined standard, whereby according to the predetermined standard the data comprises data values and attributes, whereby the respective data values are assigned to attributes, whereby semantically identical data values are assigned to the same attribute and are made distinguishable from each other by a respective hierarchical information; and whereby a software component which delivers data to the predetermined software component or which acquires data from the predetermined software component, receives the respective hierarchical information from another software component, whereby acquiring and providing data by a software component comprises transferring the respective hierarchical information, and whereby the attribute data value assignments obtain a unique ID and are linked to hierarchically organized data objects, whereby each data object comprises at an uppermost hierarchical position an ID which renders the data object uniquely identifiable.

20. The method according to claim 19, whereby the process is represented by means of a graphical model, whereby the software components and the events get graphical symbols associated therewith.

21. Software component stored on a non-transitory computer-readable medium which interacts in a computer program with a plurality of software components for executing a process, whereby each of the software components in the computer program is executable, wherein each software component acquires all the data which is to be provided by another software component, from a predetermined software component—, and each software component delivers data which is to be provided by it to other software components, to the predetermined software component, and providing and acquiring of all the data is performed according to a predetermined standard, whereby according to the predetermined standard the data values are assigned to respective attributes, whereby semantically identical data values are assigned to the same attribute, and single attributes are related to each other semantically by hierarchical relations, whereby acquiring and providing data by the software component comprises acquisition of the hierarchical relation of the data values, and provision of data values by the software component comprises transferring data values, and whereby the attribute data value assignments obtain a unique ID and are linked to hierarchically organized data objects, whereby each data object comprises at an uppermost hierarchical position an ID which renders the data object uniquely identifiable.

* * * * *